United States Patent [19]

Mori et al.

[11] Patent Number: 5,274,477
[45] Date of Patent: Dec. 28, 1993

[54] ELECTROPHOTOGRAPHIC FACSIMILE APPARATUS HAVING A PIVOTED UPPER STRUCTURE

[75] Inventors: Seiichi Mori, Fujisawa; Kazuhiro Ichinokawa, Kawagoe; Masatoshi Takano, Akikawashi; Masakazu Hirano, Tokyo; Satoshi Hokamura, Niza, all of Japan

[73] Assignee: Asahi Kogaku Kogyo Kabushiki Kaisha, Tokyo, Japan

[21] Appl. No.: 895,022

[22] Filed: Jun. 8, 1992

[30] Foreign Application Priority Data

Jun. 7, 1991 [JP] Japan .............................. 3-073725[U]

[51] Int. Cl.⁵ .......................... H04N 1/04; H04N 1/23
[52] U.S. Cl. ..................................... 358/498; 358/296; 358/300
[58] Field of Search ................... 358/296, 300, 498; 346/160, 160.1, 145

[56] References Cited

U.S. PATENT DOCUMENTS 5,138,463  8/1992  Morimoto ........................... 358/296

Primary Examiner—Edward L. Coles, Sr.
Assistant Examiner—Scott A. Rogers
Attorney, Agent, or Firm—Sandler Greenblum & Bernstein

[57] ABSTRACT

An electrophotographic facsimile apparatus is provided with a main body, a recording mechanism substantially arranged in the main body, for printing received image information onto a recording paper fed through a recording paper path by using electrophotography, and an upper structure is disposed on the main body. The electrophotographic facsimile apparatus further includes an image recording head disposed in the upper structure for reading image information of a document to be transmitted, and an operation unit for inputting operation information. The recording paper path is formed between the main body and the upper structure, and inclines obliquely downward along a direction in which the recording paper is fed. The upper structure has an inclined upper surface parallel with the recording paper path. The operation unit is disposed on the inclined upper surface of the upper structure.

5 Claims, 6 Drawing Sheets

ELECTROPHOTOGRAPHIC FACSIMILE APPARATUS HAVING A PIVOTED UPPER STRUCTURE

BACKGROUND OF THE INVENTION

The present invention relates to a facsimile apparatus for reading image information on a paper, converting the image information to an electric signal and transmitting the electric signal, as well as for printing a received image on a paper for reproduction based on an electric signal obtained by converting a received image signal. More specifically the present invention relates electrophotographic facsimile apparatus for carrying out printing by use of electrophotography.

At present, widely used facsimile apparatuses are such that image information on a paper is read and converted to an electric signal that is transmitted through a telephone circuit, as well as a received image that is printed on a paper for reproduction based on an electric signal obtained by converting a received image signal. These facsimile apparatuses generally employ a thermo-sensible recording system using a thermo-sensible paper as a transmitted image reproduction and record system (print system).

However, this thermo-sensible paper is not suitable for preservation because the thermosensible paper cannot stably record an image thereon and the recorded image becomes faded. Thus, the employment of a recording system with excellent recording stability and suitable for preservation, in particular, the employment of a recording system capable of recording an image on an easily available ordinary paper has been desired. Nevertheless, when a recording system capable of stably recording an image on a usual paper such as, for example, electrophotography or the like, is employed, a problem arises in that the size of recording mechanisms is increased, and as a result the size of the apparatus is also increased.

SUMMARY OF THE INVENTION

It is therefore an object of the present invention to provide a small size electrophotographic facsimile apparatus by employing, as a recording system, electrophotography capable of stably recording an image and suitable for preservation.

To achieve the above object, an electrophotographic facsimile apparatus according to the present invention includes a main body, a recording apparatus for printing information onto a recording paper fed along a recording paper path by using operation mechanisms for electrophotography disposed substantially in the main body, and an upper structure disposed on the main body. The electrophotographic facsimile apparatus further includes an image reading apparatus disposed in the upper structure for reading image information of a document to be transmitted, and an operation apparatus for inputting operation information into the apparatus. The recording paper path is formed between the main body and the upper structure and inclines obliquely downward along a direction in which the recording paper is fed. The upper structure has an inclined upper surface parallel with the recording paper path, and the operation apparatus is disposed on the inclined surface of the upper structure.

With this arrangement, the printing apparatus using electrophotography and a recording paper feed path can be rationally disposed and very compactly arranged. Thus, the size a facsimile performing printing on a ordinary papers, by using electrophotography, can be greatly reduced. Further, since both documents and recording papers are discharged to the front side of the apparatus, no paper discharge space is required on the rear side of the apparatus, and thus, a space occupied by the apparatus can be reduced. Furthermore, since the upper structure is composed of an upper member and a lower member between which the document path is formed and these upper and lower members are swingably attached to the rear end of the apparatus so that the front sides thereof can be opened and closed, both the recording paper path and document path can be maintained at the front side of the apparatus. Consequently, the apparatus can be installed in any place where no extra space is available in a width direction.

The above and other objects, features and advantages of the present invention will become apparent from the following detailed description which is to be read in conjunction with the accompanying drawings.

DETAILED DESCRIPTION OF PREFERRED EMBODIMENT

One embodiment of the present invention will be described below with reference to the drawings.

Figure 1:
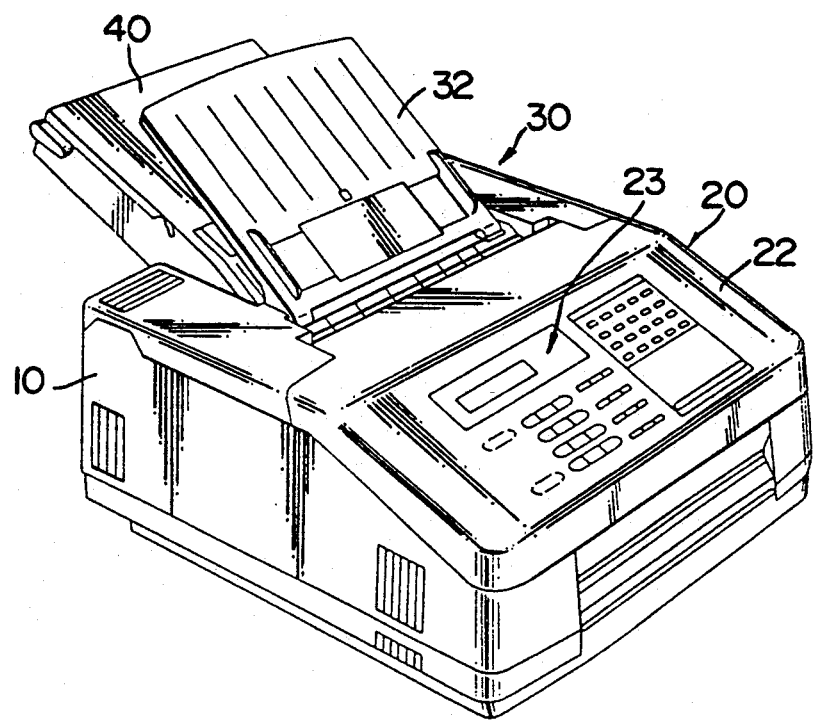
FIG. 1 is an outside perspective view of an electrophotographic facsimile apparatus of one embodiment according to the present invention.
Figure 2:
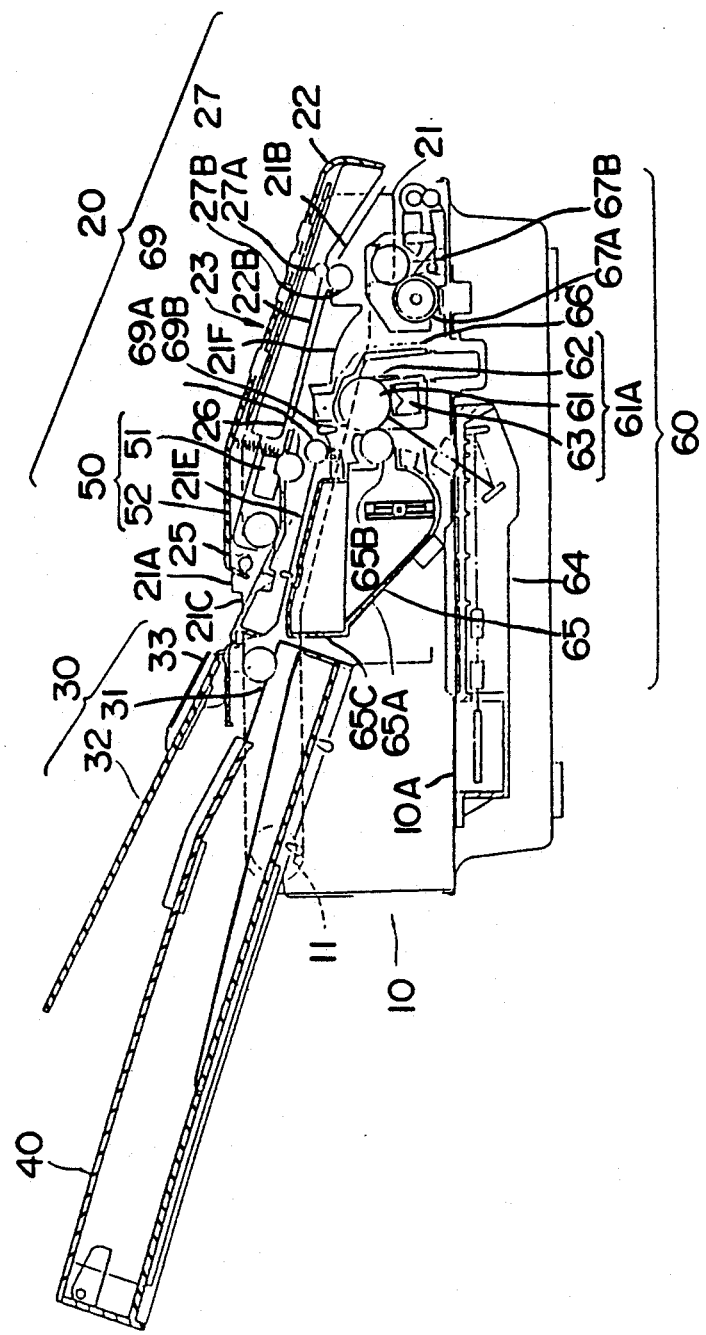
FIG. 2 is a longitudinal cross sectional view showing a schematic arrangement of the electrophotographic facsimile apparatus, as shown in FIG. 1.

FIG. 1 is a perspective view of an electrophotographic facsimile apparatus of one embodiment according to the present invention. FIG. 2 is a longitudinal cross sectional view showing a schematic arrangement of the electrophotographic facsimile apparatus, as, shown in FIG. 1, wherein the right side in FIGS. 1 and 2 corresponds to the front side of the apparatus.

As shown in FIGS. 1 and 2, the facsimile apparatus comprises a main body 10 and an upper structure 20 as a member covering the front upper portion of the main body 10. A paper feed unit 30 is disposed on the upper rear portion of the main body 10 for feeding or introducing recording papers on which received information is to be recorded and documents from which information to be transmitted is read by the apparatus.

The upper surface of the upper structure 20 gradually inclines downward toward the front end of the apparatus and an operation unit 23, including a display panel, operation buttons and the like is disposed thereon.

A reading head 50 is contained in the upper structure 20, a document to be transmitted is fed from the paper feed unit 30 through the upper structure 20. The information recorded on the document is read by the reading head 50.

A recording unit 60, provided with various operation mechanisms for electrophotography, is accommodated in the main body 10. The recording papers, to which received information is to be output, are fed from the paper feed unit 30, between the main body 10 and the upper structure 20, to the recording unit 60 where the received information is recorded onto them by the recording unit 60.

The respective units will be sequentially described in detail below.

The paper feed unit 30 is composed of a cassette mounting unit 31 having a recording paper cassette 40, detachably mounted to the recording paper introduction position of the paper feed unit 30, and a document holder 32 for documents to be transmitted located at the front edge (right side in FIG. 2) of the cassette mounting unit 31. The cassette 40, containing recording papers onto which received information is recorded.

The cassette mounting unit 31 has a recording paper introduction roller 33 disposed at the position corresponding to the upper extreme end of the recording papers contained in the recording paper cassette 40 mounted to the cassette mounting unit 31 recording paper introduction roller 33 is rotated by a drive motor (not shown).

The upper structure 20 is composed of an arm 21A, which extends from a panel frame 21 as the framework of the upper structure 20 toward the rear end of the apparatus and is swingably supported by a swing shaft 11 located at the upper rear portion of the main body 10, and an operation panel 22, which constitutes the upper surface of the upper structure 20 and is swingably supported by a pin 25 at the end of the upper struction 20 on the paper feed unit 30 side. Thus, in this arrangement the upper structure 20 can be swingingly opened and closed together with the operation panel 22 and the operation panel 22 can be swingingly opened and closed independently of the upper structure 20.

An operation panel base plate 22A is attached to the operation panel 22 along the inside (lower side) thereof. An upper document guide plate 22B is disposed inwardly of the operation panel base plate 22A (the main body 10 side). The reading head 50 is disposed in close proximity to the document introduction side of the upper document guide plate 22B (the paper feed unit 30 side).

The reading head 50 is composed of a close contact type reading sensor 51 and a document introduction roller 52 each supported by a head frame 53. The operation panel 22 is swingably supported by the pin 25 by which the panel frame 21 is also supported, with the document introduction roller 52 located at the paper feed unit 30 side.

The panel frame 21 has a lower document guide plate 21B located at the position corresponding to the upper document guide plate 22B. A feed roller 26 is located at the position corresponding to the reading sensor 51 of the reading head 50. A lower introduction unit guide 21C is located at the position corresponding to the reading head 50, respectively.

The rear end (the side adjacent to the paper feed unit 30) of the lower introduction unit guide 21C is formed as an inclined surface contiguous to the document holder 32 of the paper feed unit 30. A press and support plate 21D is disposed at the position corresponding to the document introduction roller 52 of the lower introduction unit guide 21C in the state that the press and support plate 21D are pressed and urged against the document introduction roller 52 from the lower side thereof, by an elastic return force.

Further, a pair of paper discharge rollers 27 are disposed substantially midway in the longitudinal direction of the lower document guide plate 21B and include a lower roller 27A slightly projecting above the upper surface of the lower document guide plate 21B and an upper roller 27B abutted against the projected upper surface of the lower roller 27A.

With the arrangement of the operation panel 22 and panel frame 21, a document path is formed between the document guide member on the operation panel 22 side (the reading sensor 51 and upper document guide plate 22B) and the document guide member on the panel frame 21 side (the lower introduction unit guide 21C, press and support plate 21D and lower document guide plate 21B). The document introduction roller 52 of the reading head 50, the feed roller 26 of the panel frame 21 and the lower roller 27B of the pair of paper discharge rollers 27 are driven by a drive motor (not shown) at a predetermined circumferential speed. This feeds a document placed on the document holder 32 through the document path, as along a feed path shown by a dot-dash-line in FIG. 2 and. Information recorded on the document, is recorded by being read by the reading head 50. More specifically, the document placed on the document holder 32 is introduced into the upper structure 20 by the document introduction roller 52 and the information recorded on the upper surface of the document is read by the reading sensor 51 while the document is being fed by the feed roller 26. Then, the document is fed by the pair of discharge rollers 27 and discharged through the front end of the main body 10. Note, as described above, the reading head 50 is disposed above the document feed path in this arrangement. A document is placed on the document holder 32 with the information recorded surface thereof (the surface from which information is to be read) faced upward, and thus the document is fed, the information is read and the document is discharged, in this state.

Figure 3:
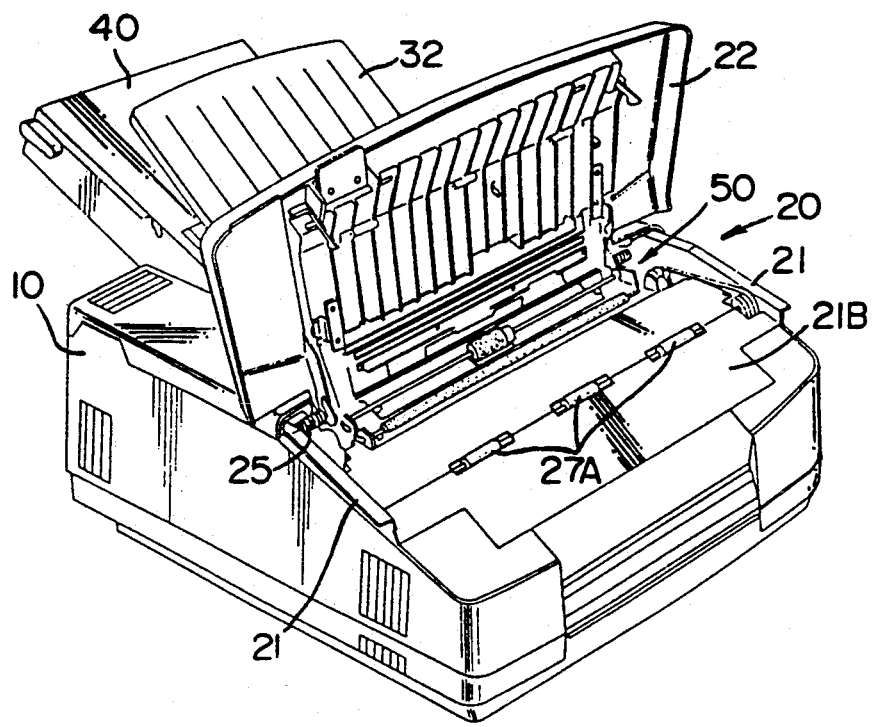
FIG. 3 is a diagram showing the electrophotographic facsimile apparatus wherein an operation panel is opened from the state, as, shown in FIG. 1.
Figure 4:
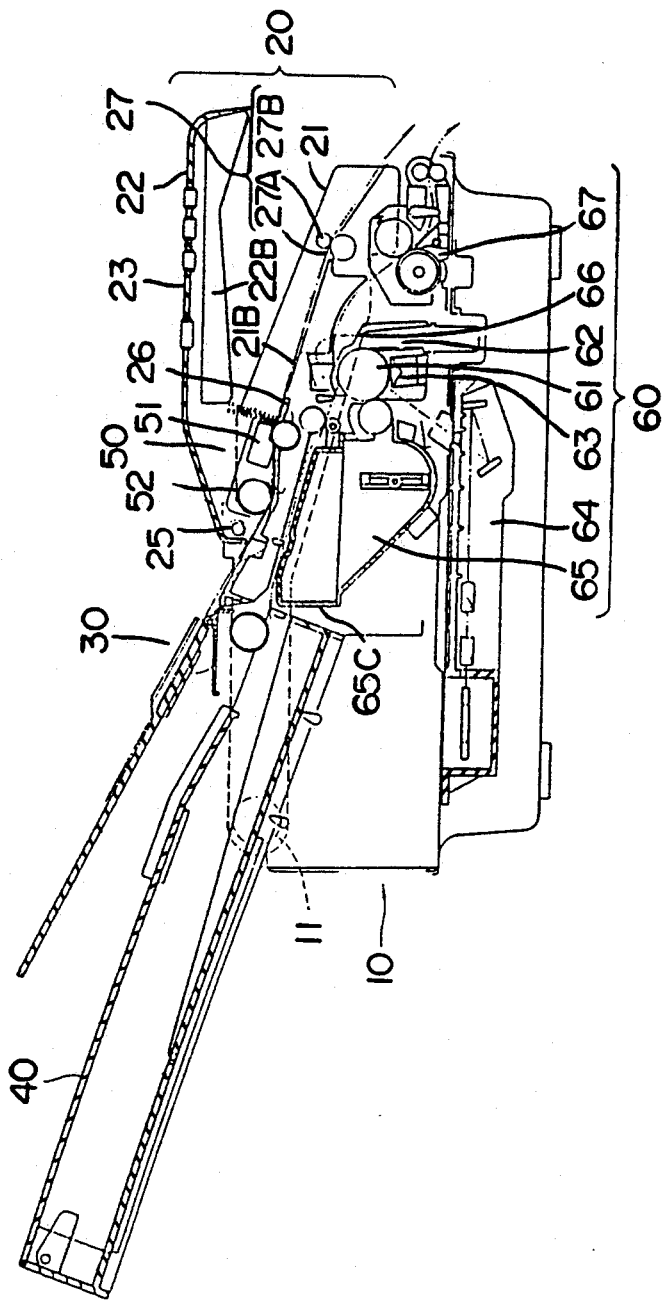
FIG. 4 is a longitudinal cross sectional view of the electrophotographic facsimile apparatus, as, shown in FIG. 3.

As shown in the perspective view of FIG. 3 and the longitudinal cross sectional view in FIG. 4, the operation panel 22 can be opened by being swung, with respect to the panel frame 21, about the pin 25 serving as a fulcrum, so that troubles such as the jamming of a document and the like can be solved and maintenance can carried out easily. Note that the operation panel 22 is in the locked to the panel frame 21 in the state that it is locked position by a lock mechanism (not shown) at the front end of the apparatus, so that it cannot be swung and opened.

On the other hand, the main body 10 includes the recording unit 60 as an image forming operation unit provided with the various operation mechanisms for electrophotography, as described above.

More specifically, there is disposed a cleaning mechanism 62 for cleaning toner remaining on the surface of a photoconductive material, a corona charger 63 for uniformly charging the photoconductive material on the surface of the photoconductive drum 61 and a scanning optical unit 64 for exposing and scanning the surface of the photoconductive drum 61 with a laser beam which is turned ON and OFF based on image information. The main body further includes development unit 65 for forming a toner image by adhering toner to the portion of the photoconductive material where a latent image is formed by the removal of electric charge therefrom by exposure, a transfer charger 66 for transferring the toner image onto a recording paper by charging the recording paper, respectively, around the photoconductive drum 61 which is driven at a predetermined circumferential speed by a drive motor (not shown) and a fixing unit 67 is disposed at a position toward which the recording paper, on which the toner image is transferred by the transfer charger 66, is fed.

The cleaning mechanism 62 includes a blade formed of an elastic member and abutted against the surface of the photoconductive drum 61 and is arranged as a photoconductive drum unit 61A by being mounted on a single frame together with the photoconductive drum 61 and corona charger 63.

The development unit 65 is composed of a toner accommodation vessel 65A and a development roller 65B, the former including a toner cartridge 65C detachably mounted thereon and the latter having a cylindrical sleeve into which a magnet roller is inserted and rotatably supported at an end of the toner accommodation vessel 65A. The toner accommodation vessel 65A has a support shaft 12 which is parallel with the development roller 65B and located at the upper position of the vessel 65A, corresponding to the right side of the toner cartridge 65C, as shown, in FIG. 2. The development unit 65 is supported by the chassis (not shown) of the main body 10 and swung about the support shaft 12 with the development roller 65B in close proximity to and substantially on a level with the photoconductive drum 61, on the rear side thereof. With respect to the apparatus, the opposite ends of the support shaft 12 are engaged with the U-shaped grooves which are formed to the chassis and opened upward.

The scanning optical unit 64 is composed of the respective components of the scanning optical system for scanning the surface of the photoconductive drum 61 with a laser beam which is turned ON and OFF based on image information and these components are integrally arranged by being mounted on a unit frame 64A. Further, the scanning optical unit 64 is mounted on the lower surface of a main body chassis 10A below the development unit 65 and paper feed unit 30 and a laser beam from the scanning optical unit 64 passes between the corona charger 63 and the development unit 65 and is projected to the photoconductive drum 61 (for scanning the photoconductive drum 61).

The transfer charger 66 is supported above the photoconductive drum 61 by the panel frame 21 of the upper structure component 20.

The fixing unit 67 is composed of a heat roller 67A heated to a predetermined temperature and a press roller 67B located obliquely upward of the heat roller 67A on the front end side of the apparatus and pressed against the heat roller 67A, and fixed on the upper surface at a predetermined position of the main body chassis 10A. The heat roller 67A is rotated at a circumferential speed in synchronism with that of the photoconductive drum 61. Thus, the fixing unit necessarily feeds a recording paper in addition to carrying out a fixing action.

The upper surface of the recording unit 60, composed of the respective operation mechanisms for electrophotography as described above, gradually inclines downward as a whole toward the front end of the apparatus. More specifically, the upper surface of the toner cartridge 65C of the development unit 65 inclines downward toward the front end thereof at a predetermined angle. The rear end of the development unit 65 is arranged to be substantially linearly contiguous to the upper surface of recording papers accommodated in the recording paper cassette 40 mounted to the cassette mounting unit 31. The upper surface of the development unit 65 is extended toward the front end of the apparatus and interferes with the upper side of the photoconductive drum 61 by a predetermined amount. Further, the upper surface of the fixing unit 67 located on the front end side of the apparatus with respect to the photoconductive drum 61 is lower than the upper side of the photoconductive drum 61.

Further, the inclined upper surface of the toner cartridge 65C of the development unit 65 is disposed in close proximity to the upper recording paper guide plate 21E disposed on the lower side of the lower introduction unit guide 21C of the panel frame 21 of the upper structure 20 with a predetermined space defined therebetween. A recording paper feed path regulation plate 21F, disposed on the lower surface of the lower document guide plate 21B of the panel frame 21, is located above the photoconductive drum 61 and the fixing unit 67 therebetween and formed to an arc shape directed from the transfer unit 66 toward the fixing unit 67 located obliquely downward of the transfer charger 66 on the front end side of the apparatus.

Furthermore, a pair of rollers 69 are composed of a roller 69B into which the support shaft 12 of the development unit 65 is inserted and a feed roller 69A disposed on the upper structure 20 side with respect to the roller 69B. The feed roller 69A is rotated by a drive motor (not shown) at the same circumferential speed as that of the photoconductive drum 61.

With the aforesaid arrangement of the recording unit 60 and upper structure 20, a recording paper feed path is formed between the recording paper guide member on the upper surface of the recording unit 60 (the upper surface of the toner cartridge 65C) and the recording paper guide member on the lower surface of the upper structure 20 (the upper recording paper guide plate 21E and recording paper feed path regulation plate 21F). Recording papers accommodated in the recording paper cassette 40 mounted to the cassette mounting unit 31 of the paper feed unit 30 are fed through the recording paper path, as along a feed path shown by a two-dot-dash-line in FIG. 4. Received information is printed on the lower surface of each of the recording papers by the recording unit 60. More specifically, the recording papers, accommodated in the recording paper cassette 40, are sequentially introduced into the recording paper path from the uppermost one thereof by the rotation of the recording paper introduction roller 33 of the cassette mounting unit 31, while the surface of the photoconductive drum 61 is (main-scanned) exposed in the rotational axis direction thereof with a laser beam modulated by received characters or image information and emitted from the scanning optical unit 64. At the same time, the photoconductive drum 61 is rotated (sub-scanned), the development unit 65 develops a latent image formed on the surface of the photoconductive drum 61 and forms a toner image. The toner image is transferred onto the recording paper fed by the pair of drive rollers 69 at a speed in synchronism with the circumferential speed of the photoconductive drum 61 and charged by the transfer charger 66. Further the toner image is fixed onto the recording paper by the fixing unit 67 and then the recording paper is discharged through the front end of the apparatus.

The recording paper is discharged by a so-called face-down discharge in which the printed surface of the paper is faced downward, whereby subsequent recording papers are sequentially deposited on the back surface of a previous recording paper and thus a page number of a subsequent recording paper follows to a page number of a previous recording paper.

Figure 5:
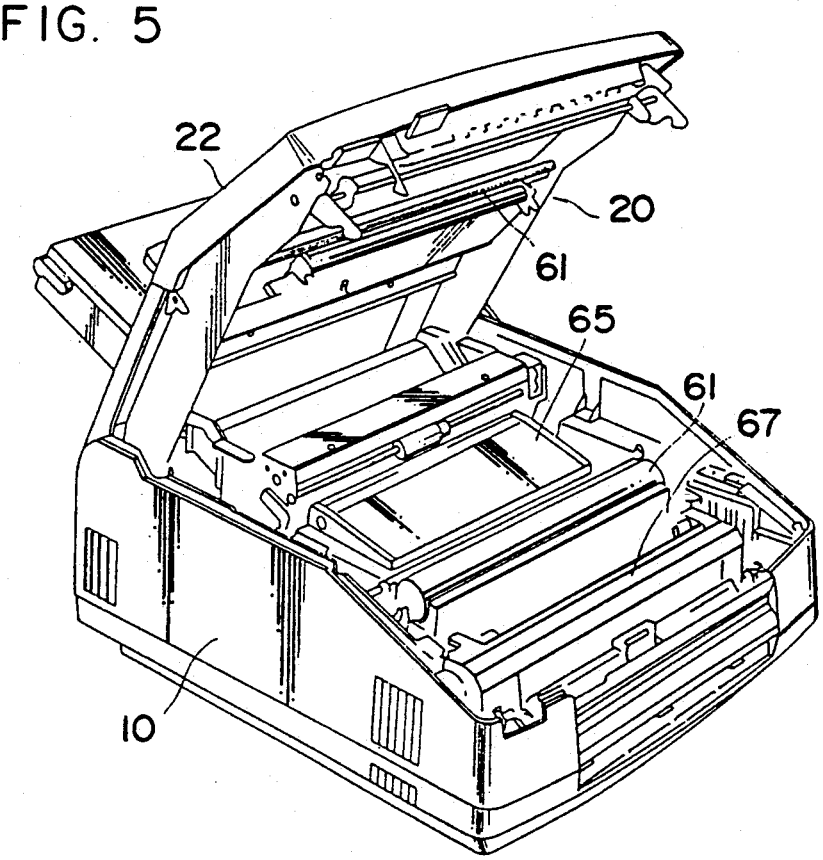
FIG. 5 is a diagram showing the electrophotographic facsimile apparatus wherein an upper structure is opened from the state, as, shown in FIG. 1.
Figure 6:
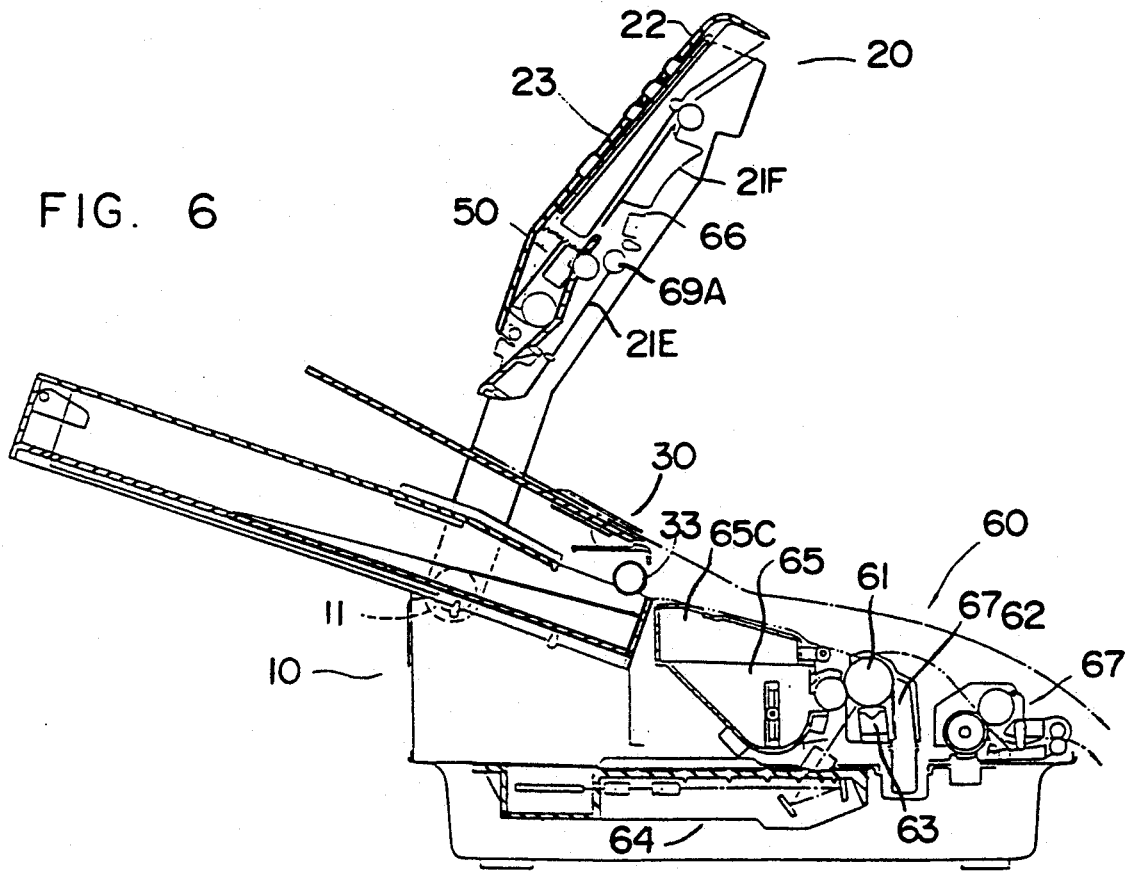
FIG. 6 is a longitudinal cross sectional view of the electrophotographic facsimile apparatus, as, shown in FIG. 5.

As shown in the perspective view of FIG. 5 and the longitudinal cross sectional view shown in FIG. 6, the recording paper path is opened by swinging upward the upper component or structure 20 about the swing shaft 11, whereby a jammed recording paper is easily removed and the recording unit 60 is also easily maintained. Note that the upper structure 20 is secured to the main body 10 by being locked by a not shown lock mechanism provided at the front end of the upper structure 20 so that it cannot be swung and opened and the aforesaid photoconductive drum unit 61A and development unit 65 are fixed to a predetermined position by being depressed by the upper structure 20 located thereabove.

The aforesaid facsimile apparatus is arranged such that the recording unit 60 is disposed in the main body 10 with the front end side thereof inclining downward, the recording paper path is formed above the recording unit 60, the upper. The upper structure 20, constituting the upper portion of the recording paper path, has the document path formed therein substantially parallel with the recording paper path. The upper surface of the upper structure 20 is formed as the operation panel 22 having substantially the same inclination as that the recording paper path. A recording paper is fed from the recording paper cassette 40 to the lower front side of the apparatus through the recording paper path. Received information is printed by the recording unit 60. A document to be transmitted is fed from the document holder 32 of the paper feed unit 30 to the lower front end of the apparatus through the document path in the upper structure 20 and read by the reading sensor 51 disposed above the document path.

With this arrangement, the respective operation mechanisms for electrophotography can be compactly accommodated in the apparatus as the recording unit 60 and the disposition of the recording paper path and document path is rationalized to make the apparatus compact as a whole. Further, since the recording paper path is disposed above the recording unit 60, recording papers can be discharged face-down through the short feed path in the state that a page of each subsequent paper follows to a page of each previous paper.

Further, since both documents and recording papers are discharged to the front side of the apparatus, no paper discharge space is required on the rear side of the apparatus. Furthermore, since the upper structure 20 and the operation panel 22 of the upper structure 20 are swingably supported by the main body 10 and the panel frame 21 at the rear end of the apparatus, respectively, and can be opened at the front end thereof, both the recording paper path and document path can be maintained at the front side of the apparatus. Thus, the apparatus can be installed in any place where no extra space is available in the right and left width directions. That is, a space occupied by the apparatus is reduced, and a degree of freedom in the selection of a location where the apparatus can be installed is greatly increased by the combination of the reduction in size of the apparatus and the fact that the apparatus does not need an extra space on the rear side, and in the right and left width directions thereof.

The present disclosure relates to subject matters contained in Japanese Utility Model Application No. HEI 3-73725 filed on Jun. 7, 1991, which is expressly incorporated herein by reference in its entirety.

What is claimed is:

1. An electrophotographic facsimile apparatus, comprising:
    a main body;
    electrophotographic printing means substantially arranged in said main body, for printing information onto a recording paper fed through a recording paper path;
    an upper structure independently swingably supported by said main body;
    image reading means arranged on said upper structure, for reading image information of a document to be transmitted; and
    operation means for inputting operation information,
    wherein said recording paper path is formed between said main body and said upper structure and inclines obliquely downward along a direction in which said recording paper is fed,
    said upper structure including a lower member attached to said main body, and an upper member being independently swingably attached to said lower member, and a document path being defined between said lower member and said upper member, said upper member being swingable independently of swinging of said upper structure, and said upper structure being swingable independently of swinging of said upper member;
    said upper member has an inclined upper surface parallel with said inclined recording paper path, and
    said operation means is disposed on the inclined upper surface of said upper member.

2. The electrophotographic facsimile apparatus according to claim 1, wherein
    said recording paper is fed toward a front side of said apparatus.

3. The electrophotographic facsimile apparatus according to claim 1, wherein
    a swing fulcrum of said upper structure is located on a rear side of said main body.

4. The electrophotographic facsimile apparatus according to claim 1, wherein
    said document path is substantially parallel with said recording paper path.

5. The electrophotographic facsimile apparatus according to claim 1, wherein
    said printing means prints at least received image information.

* * * * *

UNITED STATES PATENT AND TRADEMARK OFFICE
CERTIFICATE OF CORRECTION

PATENT NO. : 5,274,477
DATED : December 28, 1993
INVENTOR(S) : Seiichi MORI et al.

It is certified that error appears in the above-indentified patent and that said Letters Patent is hereby corrected as shown below:

On the title page, item [56], under "U.S. Patent Documents" of the printed patent, add ---5,016,029  5/1991  Mori et al.---.

Signed and Sealed this

Nineteenth Day of September, 1995

Attest:

BRUCE LEHMAN

Attesting Officer     Commissioner of Patents and Trademarks